J. HEGERHORST.
SATCHEL HANDLE.
APPLICATION FILED MAR. 12, 1918. RENEWED AUG. 16, 1919.
1,333,618.
Patented Mar. 16, 1920.
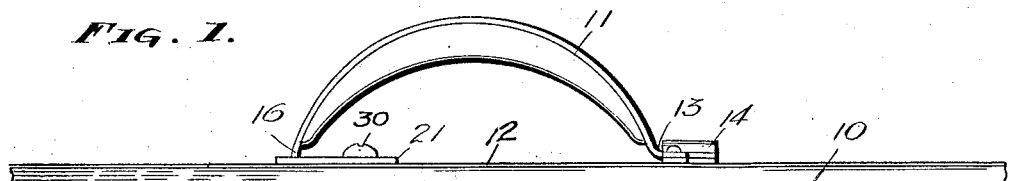
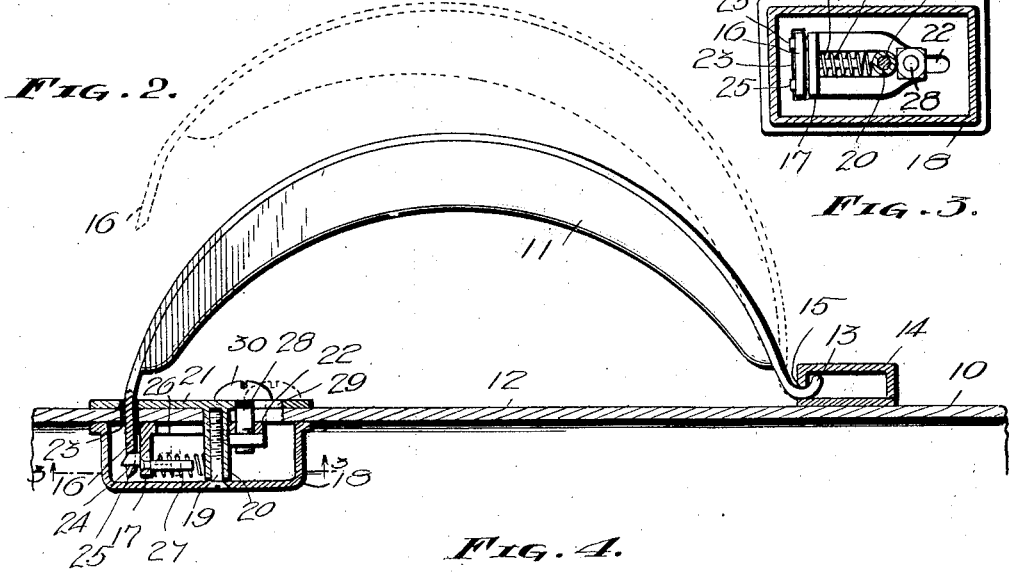
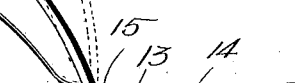
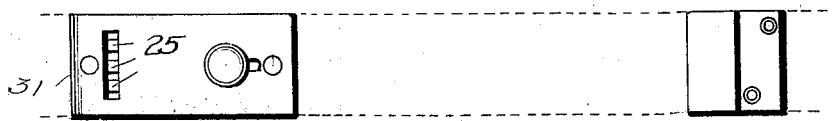
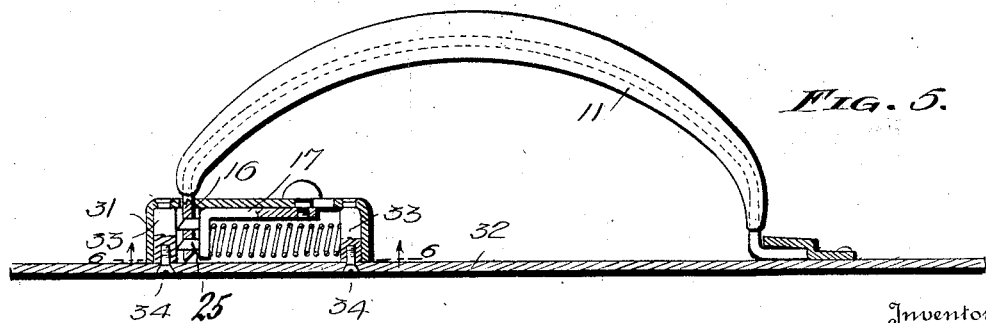
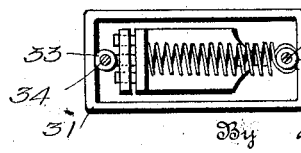
Inventor
John Hegerhorst
By
Attorneys

UNITED STATES PATENT OFFICE.

JOHN HEGERHORST, OF JEFFERSON BARRACKS, MISSOURI, ASSIGNOR TO JOHN S. BRICKNELL, OF HAMMOND, INDIANA.

SATCHEL-HANDLE.

1,333,618.     Specification of Letters Patent.    Patented Mar. 16, 1920.

Application filed March 12, 1918, Serial No. 221,938. Renewed August 16, 1919. Serial No. 318,038.

*To all whom it may concern:*

Be it known that I, JOHN HEGERHORST, a citizen of the United States, residing at Jefferson Barracks, in the county of St. Louis and State of Missouri, have invented new and useful Improvements in Satchel-Handles, of which the following is a specification.

This invention relates to handles for valises, suit cases, satchels and the like, and its object is to provide a handle having a novel and improved detachable connection with the case for the purpose of discouraging theft thereof, the handle being removed when the owner wishes to leave the case, so that the latter now cannot be conveniently carried.

The object stated is attained by means of a combination and arrangement of parts to be hereinafter described and claimed, and in order that the same may be better understood, reference is had to the accompanying drawing forming a part of this specification.

In the drawing,

Figure 1 is an elevation of the handle;

Fig. 2 is a central longitudinal section of the handle fastening means;

Fig. 3 is a section on the line 3—3 of Fig. 2;

Fig. 4 is a plan view of a modified handle fastening; Fig. 5 is a central longitudinal section thereof, and Fig. 6 is a section on the line 6—6 of Fig. 5.

Referring specifically to the drawing 10 denotes a fragment of a hand grip, satchel or similar article, provided with a handle 11 for conveniently carrying the same. This handle is detachably connected to the top 12 of the satchel or the like by the following instrumentalities:

One end of the handle 11 is fitted with a hook 13 which is insertible into a keeper housing 14 mounted on the part 12, said housing having a slot 15 through which the hook is inserted to come behind the wall of the housing in which the slot is made. Upon swinging the handle about its hooked end, the latter may be slipped out of the housing, and thus detached, but before this can be done, the other end of the handle must first be released from the part 12. The last mentioned end of the handle is detachably connected to the part 12 by providing said end with a downwardly projecting keeper tongue 16 engageable by a latch bolt 17.

On the bottom of the part 12 is a housing 18 inclosing the bolt 17 and secured to said part 12 by a screw 19 threaded into a hollow post 20 from the bottom of the housing, said post depending from a plate 21 seating on the outside of the part 12, the latter having a slot 22 through which the post passes and extends into the housing to the bottom wall thereof.

In the parts 12 and 21 are registering slots 23 through which the tongue 16 is adapted to be passed into the housing 18 for engagement by the bolt 17. The tongue 16 has one or more apertures 24, and the forward end of the bolt 17 has a corresponding number of projecting studs 25 to enter the same. These apertures and lugs may be arranged in different ways and numbers so that only a handle to match will fit the locking device.

The bolt 17 is slidable in the direction of its length, and it is guided by the post 20, it being provided with a longitudinal slot 26 through which the post extends.

A spring 27 engages the bolt 17 to advance the same to locking position, and it is retracted to release the handle, by a pin 28 connected to its rear end and passing through the slot 22 and a slot 29 in the plate 21 registering therewith. On the outside of the plate 21, the pin 28 is provided with a finger button 30 to facilitate its operation.

When the bolt 17 is retracted to release the tongue 16, the handle is free to be swung upward at this end to disengage its hooked end as hereinbefore described, and shown dotted in Fig. 2, and the handle is now detached from the satchel or other part. By a reversal of this operation, the handle can be readily replaced.

Figs. 4 to 6 show a slightly modified structure, the invention being here shown applied to a valise or grip having a steel top. The latch casing 31 is placed on top of the upper steel strip 32, the top of the casing having two depending hollow posts 33 into which screws 34 are threaded from beneath the strip 32.

I claim:

The combination with a valise or the like; of a handle therefor having a hook at one end, a latch-keeper tongue on the other end of the handle, a keeper on the valise top with which the hook is detachably engageable, the hook being disengageable from the keeper by swinging the second-mentioned end of the handle outward of the valise top, a housing carried by the valise top on the inside thereof, and a latch-bolt working in the housing, the valise top having an aperture opening into the housing, and the latch-bolt being insertible into the housing for engagement by the latch bolt through the aforesaid aperture in the valise top, for locking the handle against the aforesaid swinging movement to disengage the hook from its keeper.

In testimony whereof I affix my signature.

JOHN HEGERHORST.